(12) United States Patent
Brown

(10) Patent No.: US 6,644,241 B2
(45) Date of Patent: Nov. 11, 2003

(54) DISPOSABLE INSERT CONTAINING PET DISH APPARATUS

(76) Inventor: Karen M. Brown, 8 Northgate, Wanaque, NJ (US) 07465

( * ) Notice: Subject to any disclaimer, the term of this patent is extended or adjusted under 35 U.S.C. 154(b) by 145 days.

(21) Appl. No.: 10/217,969

(22) Filed: Aug. 13, 2002

(65) Prior Publication Data

US 2003/0033986 A1 Feb. 20, 2003

Related U.S. Application Data

(60) Provisional application No. 60/312,615, filed on Aug. 16, 2001.

(51) Int. Cl.[7] ............................ A01K 1/10; A01K 39/00; A01K 5/00
(52) U.S. Cl. ........................ 119/61; 119/72; 119/51.01
(58) Field of Search ...................... 119/72, 61, 51.01, 119/51.5, 74, 75, 76

(56) References Cited

U.S. PATENT DOCUMENTS

| 4,257,353 A | | 3/1981 | Imhoff | |
| 4,428,325 A | | 1/1984 | Koch | |
| 4,587,930 A | | 5/1986 | Trego | |
| 4,800,845 A | | 1/1989 | Budd | |
| 4,949,678 A | | 8/1990 | Demko | |
| 5,709,168 A | * | 1/1998 | Walker | 119/61 |
| 5,782,374 A | * | 7/1998 | Walker | 220/23.87 |
| 5,881,670 A | * | 3/1999 | Pelsor | 119/61 |
| 6,112,698 A | * | 9/2000 | Zelinger | 119/61 |

* cited by examiner

Primary Examiner—Charles T. Jordan
Assistant Examiner—Judith A. Nelson

(57) ABSTRACT

A pet dish apparatus includes a dish-shaped base unit which has a first dish lock portion in the form of an annular groove on an inside surface of the dish-shaped base unit and includes a dish member received in the dish-shaped base unit. The dish member includes a second dish lock portion in the form of an annular tongue on the outside surface of the dish member which is engageable with the first dish lock portion annular groove. The dish member is received in the dish-shaped base unit in a nesting manner. An annular peripheral top ring extends outward from a dish wall of the dish member. Two dish-shaped base units can be connected together with an annular peripheral top ring in a form of a figure-eight.

8 Claims, 3 Drawing Sheets

US 6,644,241 B2

DISPOSABLE INSERT CONTAINING PET DISH APPARATUS

CROSS-REFERENCE TO RELATED APPLICATION

This application claims priority based upon my copending Provisional Application Serial No. 60/312,615, filed Aug. 16, 2001.

BACKGROUND OF THE INVENTION

1. Field of the Invention

The present invention relates generally to pet dishes, and, more particularly, to pet dishes that are especially adapted for being disposable.

2. Description of the Prior Art

Dishes specially adapted for use with pets are well known in the art. In addition, throughout the years, a number of innovations have been developed relating to disposable pet dishes, and the following U.S. patents are representative of some of those innovations: U.S. Pat. Nos. 4,257,353, 4,428, 325, 4,587,930, 4,800,845, and 4,949,678. More specifically, U.S. Pat. No. 4,257,353 discloses a disposable pet dish that includes a skeleton-like frame for receiving and holding a disposable pet dish. The skeleton-like frame may be relatively lightweight resulting in less than optimum stability for the disposable pet dish. In this respect, it would be desirable if a disposable pet dish were provided with a support that is not skeleton-like and that provides optimum stability for the disposable pet dish.

U.S. Pat. No. 4,428,325 discloses a disposable pet dish that fits into a bowl-like base. The disposable pet dish has a large upper lip that fits over the top of the bowl-like base and extends downward along a portion of the side of the base. The outside surface of the base has grooves that receive complementary flange portions of the disposable pet dish. The engagement of the flange portions of the disposable pet dish with the grooves of the base provide a locking action between the disposable pet dish and the base. To provide for greater economy and simplicity in a disposable pet dish, it would be desirable if a disposable pet dish engages with its base on an inside portion of the base. Such an inside the base engagement would eliminate the need for a large upper lip in a disposable pet dish that fits over the top of a bowl-like base and that extends downward along a portion of the side of the base.

U.S. Pat. No. 4,587,930 discloses a disposable pet dish which is supported by a base which is fixed to a wall. To provide greater flexibility of use, it would be desirable if a disposable pet dish were provided with a base that is freely moved from one location to another.

U.S. Pat. No. 4,800,845 discloses a disposable pet dish that fits into a base. The base has two disposable pet dish reception wells side by side. Although having two pet dish reception wells side by side may be desirable under some circumstances, there are other circumstances when a single, free standing disposable pet dish received in a single, free standing base would be desirable. Moreover, no lid is provided for this disposable pet dish. There are times when not all of the pet food is eaten, and it would be desirable to have a lid that fits over the disposable pet dish so that the leftover food can be preserved.

U.S. Pat. No. 4,949,678 discloses a disposable pet dish that is received in a base that has an adhesive patch on the bottom of the base. The adhesive patch is provided to give greater stability of the base to a surface upon which the base sits. If the surface upon which the base sits is wet, such an adhesive patch will most likely be ineffective. Moreover, the adhesive may stick to the surface, and time and effort may have to be expended to remove adhesive that sticks to a surface. In this respect, it would be desirable if a base for a disposable pet dish were provided that does not include an adhesive patch for affixing the base to a supporting surface.

Still other features would be desirable in a disposable insert containing pet dish apparatus. For example, for purposes of economy in using storage space, it would be desirable if a disposable pet dish were provided which is readily nestable and stackable with respect to other disposable pet dishes. In this way, a large number of disposable pet dishes can be stored, taking up a minimum of storage space.

As stated above, there are circumstances when having two pet dish bases side by side may be desirable, and there are other circumstances when a single, free standing disposable pet dish received in a single, free standing base would be desirable. In this respect, it would be desirable if single, free standing bases were modular and could be linked together to form a combined unit having two pet dish reception bases side by side.

Thus, while the foregoing body of prior art indicates it to be well known to use disposable pet dishes, the prior art described above does not teach or suggest a disposable insert containing pet dish apparatus which has the following combination of desirable features: (1) provides a support that is not skeleton-like and that provides optimum stability for the disposable pet dish; (2) provides a disposable pet dish which engages with its base on an inside portion of the base; (3) provides a base that can be freely moved from one location to another; (4) provides a single, free standing disposable pet dish that is received in a single, free standing base; (5) provides a lid for a disposable pet dish; (6) does not include an adhesive patch for affixing the base to a supporting surface; (7) is readily nestable and stackable with respect to other disposable pet dishes; and (8) provides modular single, free standing bases that can be linked together to form a combined unit having two pet dish reception bases side by side. The foregoing desired characteristics are provided by the unique disposable insert containing pet dish apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a pet dish apparatus which includes a dish-shaped base unit which has a first dish lock portion and includes a dish member received in the dish-shaped base unit. The dish member includes a second dish lock portion which is engageable with the first dish lock portion. The dish member is received in the dish-shaped base unit in a nesting manner. Preferably, the first dish lock portion is in a form of an annular groove, and the second dish lock portion is in a form of an annular tongue that fits into the annular groove.

The dish member includes a material reception region defined by a dish floor and a dish wall which extends upward from the dish floor. An annular peripheral top ring extends outward from the dish wall. The dish-shaped base unit includes a top ring-reception surface for receiving the top ring of the dish member.

Preferably, the dish wall includes a plurality of inwardly extending hollow hemispherical dish wall bulge portions, wherein each dish wall bulge portion includes an inner convex dish wall bulge surface and an outer concave dish wall bulge surface.

Preferably, the dish-shaped base unit includes a plurality of inner convex base unit wall bulges which fit into the outer concave dish wall bulge surfaces when the dish-shaped base unit receives the dish member. A plurality of the dish members are nestable with respect to each other during storage. A lid is provided for fitting tightly onto the top ring of the dish member.

With another embodiment of the invention, base-to-base interconnection means are provided for connecting a first pet dish apparatus to a second pet dish apparatus. The base-to-base interconnection means can be a dish member including an annular peripheral top ring in a form of a figure-eight.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved disposable insert containing pet dish apparatus which has all of the advantages of the prior art and none of the disadvantages.

It is another object of the present invention to provide a new and improved disposable insert containing pet dish apparatus which may be easily and efficiently manufactured and marketed.

It is a further object of:the present invention to provide a new and improved disposable insert containing pet dish apparatus which is of durable and reliable construction.

An even further object of the present invention is to provide a new and improved disposable insert containing pet dish apparatus which is susceptible of a low cost of manufacture with regard to both materials and labor, and which accordingly is then susceptible of low prices of sale to the consuming public, thereby making such disposable insert containing pet dish apparatus available to the buying public.

Still yet a further object of the present invention is to provide a new and improved disposable insert containing pet dish apparatus which provides a support that is not skeleton-like and that provides optimum stability for the disposable pet dish.

Still another object of the present invention is to provide a new and improved disposable insert containing pet dish apparatus that provides a disposable pet dish which engages with its base on an inside portion of the base.

Yet another object of the present invention is to provide a new and improved disposable insert containing pet dish apparatus which provides a base that can be freely moved from one location to another.

Even another object of the present invention is to provide a new and improved disposable insert containing pet dish apparatus that provides a single, free standing disposable pet dish that is received in a single, free standing base.

Still a further object of the present invention is to provide a new and improved disposable insert containing pet dish apparatus having a lid therefor to enhance portability and storage.

Yet another object of the present invention is to provide a new and improved disposable insert containing pet dish apparatus that does not include an adhesive patch for affixing the base to a supporting surface.

Still another object of the present invention is to provide a new and improved disposable insert containing pet dish apparatus which is readily nestable and stackable with respect to other disposable pet dishes.

Yet another object of the present invention is to provide a new and improved disposable insert containing pet dish apparatus that provides modular single, free standing bases that can be linked together to form a combined unit having two pet dish reception bases side by side.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
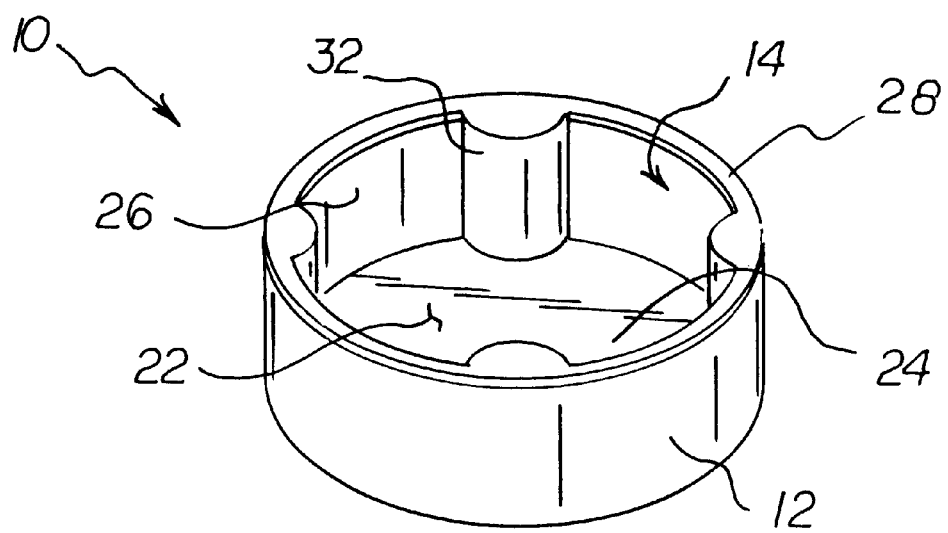
FIG. 1 is a top perspective view showing a first embodiment of the disposable insert containing pet dish apparatus of the invention.
Figure 2:
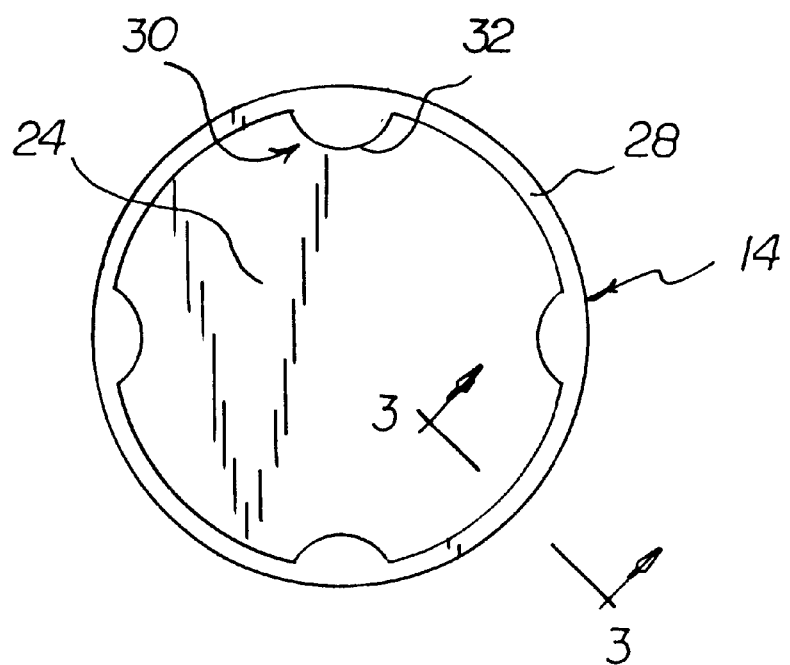
FIG. 2 is a top view of the embodiment of the disposable insert containing pet dish apparatus shown in FIG. 1.

With reference to the drawings, a new and improved disposable insert containing pet dish apparatus embodying the principles and concepts of the present invention will be described.

Turning to FIGS. 1–5, there is shown a first embodiment of the disposable insert containing pet dish apparatus of the invention generally designated by reference numeral 10. In its preferred form, disposable insert containing pet dish apparatus 10 includes a dish-shaped base unit 12 which has a first dish lock portion and includes a dish member 14 received in the dish-shaped base unit 12. The dish member 14 includes a second dish lock portion which is engageable with the first dish lock portion. The dish-shaped base unit 12 is substantially rigid or stiff. The dish member 14 is received in the dish-shaped base unit 12 in a nesting manner.

Preferably, the first dish lock portion is in a form of an annular groove 16, and the second dish lock portion is in a form of an annular tongue 18 that fits into the annular groove 16.

The dish member 14 includes a material reception region 22 defined by a dish floor 24 and a cylindrical dish wall 26 which extends upward from the dish floor 24. An annular peripheral top ring 28 extends outward from the dish wall 26. The dish-shaped base unit 12 includes a top ring-reception surface 38 for receiving the top ring 28 of the dish member 14. The dish wall 26 includes a plurality of inwardly extending hollow hemispherical dish wall bulge portions 30, wherein each dish wall bulge portion 30 includes an inner convex dish wall bulge surface 32 and an outer concave dish wall bulge surface 34.

Figure 3:
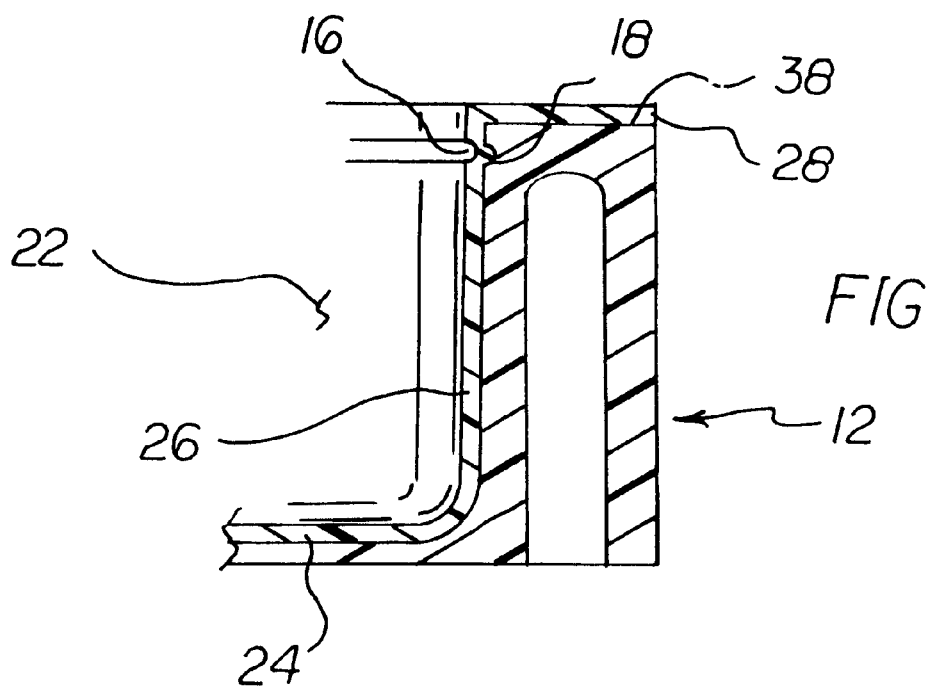
FIG. 3 is an enlarged partial cross-sectional view of the embodiment of the disposable insert containing pet dish apparatus of FIG. 2 taken along line 3—3 thereof.
Figure 4:
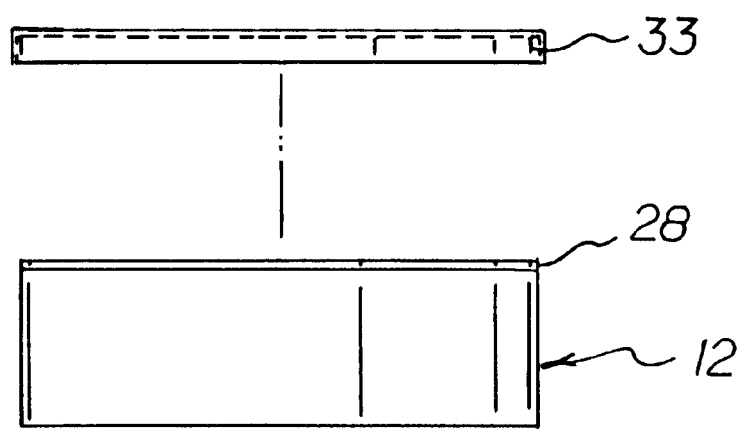
FIG. 4 is a partially exploded side view of the embodiment of the invention shown in FIGS. 1–3 which further includes a lid.

The dish-shaped base unit 12 includes a plurality of inner convex base unit wall bulges 36 which fit into the outer concave dish wall bulge surfaces 34 when the dish-shaped base unit 12 receives the dish member 14. By this arrangement, relative rotation of the dish member 14 relative to the base unit 12 is avoided when these parts are nested together substantially as shown in FIGS. 1 and 3. Preferably, a plurality of the dish members 14 are nestable with respect to each other during storage. To facilitate portability and storage, a removable lid 33 may be provided substantially as shown for fitting tightly onto the top ring 28 of the dish member 14.

Figure 6:
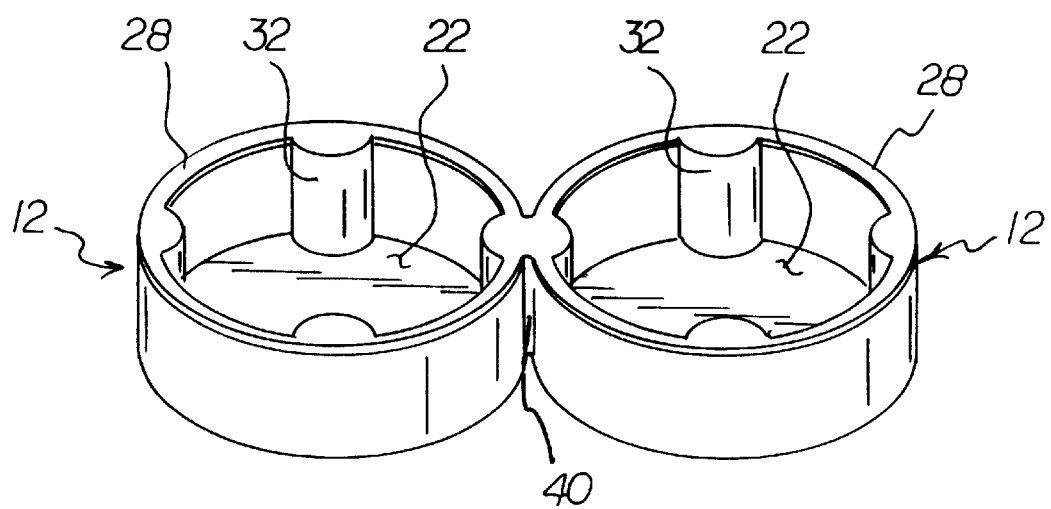
FIG. 6 is a perspective view of a second embodiment of the invention which includes two pet dish apparatus units of the invention connected together.

Turning to FIG. 6, a second embodiment of the invention is shown. Reference numerals are shown that correspond to like reference numerals that designate like elements shown in the other figures. In addition, base-to-base interconnection means are provided for connecting a first pet dish apparatus to a second pet dish apparatus. The base-to-base interconnection means can be in a form of an annular peripheral unitary top ring 28 in a form of a figure-eight. By this arrangement, the unitary top ring 28 in the form of a figure-eight joins two dish members 14 together and advantageously serves to interlock two base units together in a side-by-side relationship substantially as depicted in FIG. 6. Similarly, two storage lids 33 may be joined together in the form of a figure-eight to form a unitary storage lid for two dish units/base units.

Figure 5:
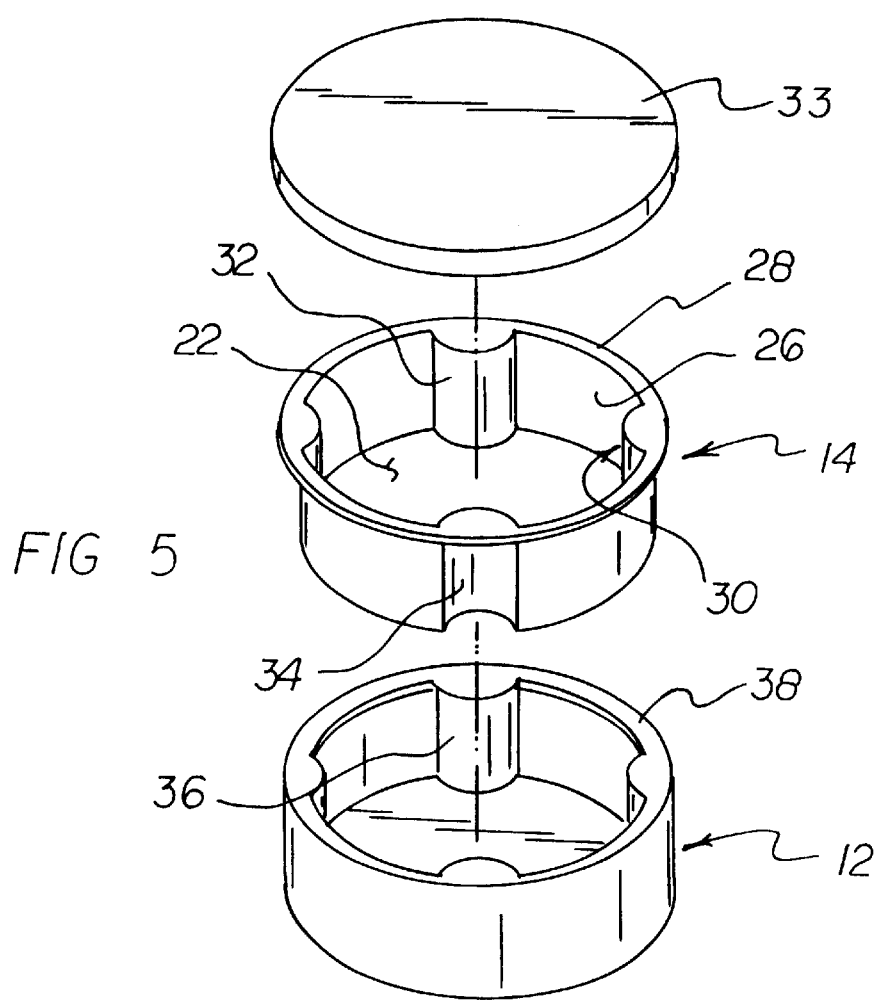
FIG. 5 is a fully exploded perspective view of the embodiment of the invention shown in FIG. 4.

It will be appreciated of course, that optionally the dish units may be separate individual units as shown in FIG. 5. Still further, if desired, two dish-shaped base units 12 may be joined together by a small bridge 40 (FIG. 6) of either rigid or flexible plastic material therebetween.

To use a pet dish apparatus 10 of the invention, the dish-shaped base unit 12 is obtained, and a dish member 14 is inserted into the dish member 14, as shown in FIGS. 1–5. The dish wall bulge surfaces 34 nest with the base unit wall bulges 36, and the dish walls 26 nest with the base walls. In addition, the annular peripheral top ring 28 of the dish member 14 rests upon the top ring-reception surface 38 of the dish-shaped base unit 12. Furthermore, the annular tongue 18 of the dish member 14 fits into the annular groove 16 of the dish-shaped base unit 12. In this way, the dish member 14 is fitted securely into the dish-shaped base unit 12.

One of the pet dish apparatuses 10 of the invention can be used for a pet's food, and another of the pet dish apparatuses 10 can be used for the pet's water. Food and water are placed in the respective material reception regions 22 of respective pet dish apparatuses 10.

Alternatively, as shown in FIG. 6, the two bonded pet dish apparatuses 10, can be used. One of the two pet dish apparatuses 10 can be used for food, and the other of the pet dish apparatuses 10 can be used for water. As shown in FIG. 6, with this second embodiment of the invention, the annular peripheral top ring 28 is shaped like a figure-eight, for covering the respective top ring-reception surfaces 38 of the two dish-shaped base units 12.

It will be appreciated that the dish member 14 for each embodiment of the invention can be in the form of a thin, lightweight, disposable, plastic dish (or other suitable material such as aluminum, for example) capable of suitably supporting a quantity of food or water when standing alone. When inserted into the substantially rigid dish-shaped base unit 12, the thin, lightweight, disposable, dish is securely supported by the dish-shaped base unit 12, especially when the dish member 14 is completely full of food or water.

When they are to be removed from the dish-shaped base unit 12 and replaced, the dish members 14 are easily removed from the dish-shaped base units 12 by pulling up on the annular peripheral top ring 28 and easily displacing the annular tongue 18 from the annular groove. 16. A replacement dish member 14 is easily inserted into a dish-shaped base unit 12, and the annular tongue 18 of the dish member 14 easily snaps into the annular groove 16 of the dish-shaped base unit 12 when the dish member 14 is pushed into the dish-shaped base unit 12. The dish-shaped base unit 12 can be made from rigid plastic or metal materials.

The components of the disposable insert containing pet dish apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved disposable insert containing pet dish apparatus that is low in cost, relatively simple in design and operation, and which advantageously provides a support that is not skeleton-like and that provides optimum stability for the disposable pet dish. With the invention, a disposable insert containing pet dish apparatus provides a disposable pet dish which engages with its base on an inside portion of the base. With the invention, a disposable insert containing pet dish apparatus provides a base that can be freely moved from one location to another. With the invention, a disposable insert containing pet dish apparatus provides a single, free standing disposable pet dish that is received in a single, free standing base. With the invention, a disposable insert containing pet dish apparatus provides a lid for a disposable pet dish. With the invention, a disposable insert containing pet dish apparatus is provided which does not include an adhesive patch for affixing the base to a supporting surface. With the invention, a disposable insert containing pet dish apparatus is provided which is readily nestable and stackable with respect to other disposable pet dishes. With the invention, a disposable insert containing pet dish apparatus provides modular single, free standing bases that can be linked together to form a combined unit having two pet dish reception bases side by side.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use. For example, the base units, dish units and storage lids may be produced in various monochromatic or mixed colors to increase aesthetic appeal. Also, the removably insertable dish members may be made strong enough to be provided with pre-filled food or water preserved by a foil seal, or the like, underneath the removable lid therefor.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A pet dish apparatus, comprising:
   a dish-shaped base unit which includes a first dish lock portion in a form of an annular groove located on an inside surface of said dish-shaped base unit;
   a dish member received in said dish-shaped base unit, wherein said dish member includes a second dish lock portion in a form of an annular tongue located on an outside surface of said dish member that fits into said groove;
   a material reception region defined by a dish floor and a annular dish wall which extends upward from said dish floor; and
   an annular peripheral top ring which extends outward from said dish wall.

2. The apparatus of claim 1 wherein said dish-shaped base unit includes a top ring-reception surface for receiving said top ring of said dish member.

3. The apparatus of claim 1, further including:
   a removable lid for fitting tightly onto said top ring of said dish member.

4. The apparatus of claim 1, further including:
   base-to-base interconnection means for connecting a first pet dish apparatus to a second pet dish apparatus.

5. The apparatus of claim 4 wherein said base-to-base interconnection means is in a form of an annular peripheral top ring in a form of a figure-eight and which connects said first pet dish apparatus to said second pet dish apparatus.

6. The apparatus of claim 3 wherein said dish member includes a quantity of pre-filled material and said lid maintains said material in said dish member until said lid is removed from said dish member.

7. The apparatus of claim 6 wherein said pre-filled material is selected from the group comprising pet food and water.

8. A pet dish apparatus, comprising:
   a dish-shaped base unit which includes a first dish lock portion in a form of an annular groove located on an inside surface of said dish-shaped base unit;
   a removable dish member received in said dish-shaped base unit, wherein said dish member includes a second dish lock portion in a form of an annular tongue located on an outside surface of said dish member that fits into side annular groove, wherein said dish wall includes a plurality of inwardly extending hollow hemispherical dish wall bulge portion, wherein each dish wall bulge portion includes an inner convex dish wall bulge surface and an outer concave dish wall bulge surface, and wherein said dish-shaped base unit includes a plurality of inner convex base unit wall bulges when fit into said outer concave dish wall bulge surfaces when said dish-shaped base unit receives said dish member;
   a material reception region defined by a dish floor and a annular dish wall which extends upward from said dish floor;
   an annular peripheral top ring which extends outward from said dish wall, said apparatus further including a removable lid for fitting tightly onto said top ring of said dish member.

* * * * *